United States Patent
Stayton et al.

(10) Patent No.: US 11,702,090 B2
(45) Date of Patent: Jul. 18, 2023

(54) SYSTEM FOR AN AUTOMATED VEHICLE

(71) Applicant: Nissan North America, Inc., Franklin, TN (US)

(72) Inventors: Erik Stayton, Ashland, MA (US); Jingyi Zhang, San Jose, CA (US); Melissa Cefkin, Willow Glen, CA (US)

(73) Assignee: Nissan North America, Franklin, TN (US)

( * ) Notice: Subject to any disclaimer, the term of this patent is extended or adjusted under 35 U.S.C. 154(b) by 188 days.

(21) Appl. No.: 16/532,971

(22) Filed: Aug. 6, 2019

(65) Prior Publication Data

US 2021/0039662 A1 Feb. 11, 2021

(51) Int. Cl.
*G05D 1/00* (2006.01)
*B60W 50/08* (2020.01)
*B60W 30/02* (2012.01)

(52) U.S. Cl.
CPC .......... *B60W 50/08* (2013.01); *B60W 30/025* (2013.01); *G05D 1/0088* (2013.01); *B60W 2520/10* (2013.01); *B60W 2540/18* (2013.01); *B60W 2556/00* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 9,087,099 B2 | 7/2015 | Camacho et al. | |
| 9,672,738 B1 | 6/2017 | Ferguson | |
| 9,940,651 B2 | 4/2018 | Ross et al. | |
| 10,012,993 B1 | 7/2018 | Matus et al. | |
| 10,023,114 B2 | 7/2018 | Adams et al. | |
| 10,049,408 B2 | 8/2018 | Carver et al. | |
| 10,118,628 B2 | 11/2018 | Lundsgaard | |
| 10,139,828 B2 | 11/2018 | Ho et al. | |
| 10,239,538 B1 | 3/2019 | Fields et al. | |
| 2010/0217494 A1* | 8/2010 | Heft | B60T 8/32 701/70 |
| 2014/0129075 A1* | 5/2014 | Carleton | B60W 30/09 701/27 |
| 2015/0006013 A1* | 1/2015 | Wimmer | B60W 50/14 701/23 |
| 2017/0305434 A1 | 10/2017 | Ratnasingam | |
| 2017/0372431 A1 | 12/2017 | Perl et al. | |

(Continued)

OTHER PUBLICATIONS

D Cheng, "Case Studies on Learning and Control Architectures for Autonomous Systems", Jan. 2013, pp. 69, Defence R&D Canada.

(Continued)

*Primary Examiner* — James M McPherson
(74) *Attorney, Agent, or Firm* — Global IP Counselors, LLP

(57) ABSTRACT

A system for an automated vehicle includes a user input interface and an electronic controller. The electronic controller is programmed with instructions to operate at least one aspect of the automated vehicle, is configured to process information input through the user input interface, the information including data directed to predetermined parameters related to the at least one aspect of the automated vehicle at a predetermined location, and update the instructions based on the information to alter the least one aspect of the automated vehicle.

18 Claims, 13 Drawing Sheets

(56) References Cited

U.S. PATENT DOCUMENTS

| | | |
|---|---|---|
| 2018/0075380 A1 | 3/2018 | Perl et al. |
| 2018/0229723 A1 | 8/2018 | Jiang et al. |
| 2018/0345981 A1 | 12/2018 | Ferguson et al. |
| 2019/0019133 A1 | 1/2019 | Allen |
| 2019/0049981 A1 | 2/2019 | Fischer |
| 2019/0066535 A1 | 2/2019 | Pifko et al. |
| 2019/0072966 A1 | 3/2019 | Zhang et al. |
| 2019/0079659 A1 | 3/2019 | Adenwala et al. |
| 2019/0101914 A1 | 4/2019 | Coleman, II et al. |
| 2019/0102840 A1 | 4/2019 | Perl et al. |
| 2019/0129438 A1* | 5/2019 | Morita ............... G01C 21/3623 |
| 2020/0398810 A1* | 12/2020 | Zebiak ................. B60W 10/06 |
| 2020/0409368 A1* | 12/2020 | Caldwell .............. G05D 1/0212 |

OTHER PUBLICATIONS

P Kaur et al., "Simulation and Deep CNN based architecture for validation of Intelligent automotive functions", Sep. 19-22, 2018, International Conference on Advances in Computing, Communications and Informatics (ICACCI), pp. 2344-2348, Bangalore, India.

* cited by examiner

Socially Acceptable Behavior Index - Intersections and Crosswalks

Location: _____     Car: _____

Interacting Agents:     Vehicle [  ]     Pedestrian [  ]     Bike [  ]
                                        Vehicle Behind [  ]

[Overrides]
[ ] ENTERING
Inappropriate steering              -          -          -          -          [ ]
Inappropriate longitudinal motion   -          -          -          [ ]
*Pace:*

         v.slow     slow     neutral     fast     v.fast

[ ] AT
Stopped in an inappropriate place   -          -          -          [ ]
*Wait time:*

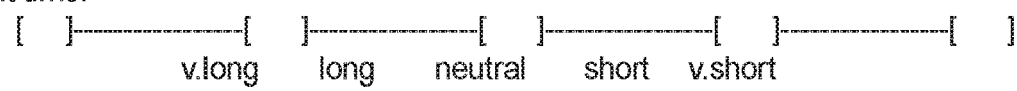
         v.long     long     neutral     short     v.short

[ ] LEAVING
Inappropriate steering              -          -          -          -          [ ]
Inappropriate edging / stop & go    -          -          -          [ ]
Lingered in uncomfortable location  -          -          [ ]
*Pace:*

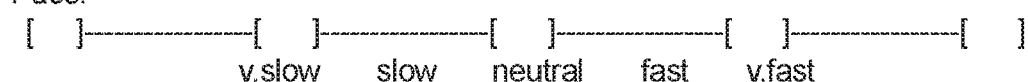
         v.slow     slow     neutral     fast     v.fast

Went out of turn                    -          -          -          -          -          [ ]

Overall Fluidity of Motion

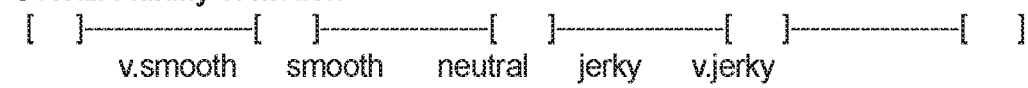
         v.smooth     smooth     neutral     jerky     v.jerky

Other
_____

FIG. 5A

Socially Acceptable Behavior Index - Obstacle Avoidance

Location: _____     Car: _____

Interacting Agents:     Vehicle [ ]     Pedestrian [ ]     Bike [ ]
                            Vehicle Behind [ ]

[Overrides]
[ ] APPROACHING
Inappropriate steering          -     -     -     -     [ ]
Inappropriate longitudinal motion     -     -     -     [ ]
*Pace:*
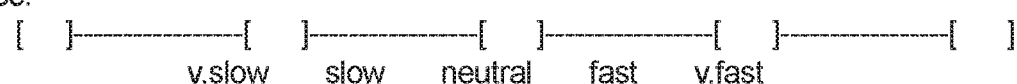
        v.slow    slow    neutral    fast    v.fast

[ ] AT
Stopped in an inappropriate place     -     -     -     [ ]
*Wait time:*
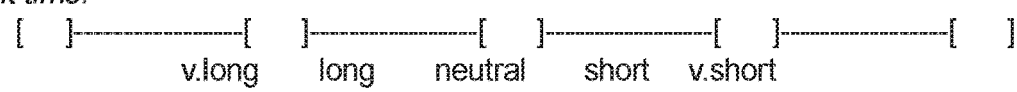
        v.long    long    neutral    short    v.short Went out of turn          -     -     -     -     -     [ ]

[ ] PASSING
Inappropriate steering          -     -     -     -     [ ]
Inappropriate edging / stop & go     -     -     -     [ ]
Passed on inappropriate side     -     -     -     [ ]
Passed too close to obstacle     -     -     -     -     [ ]
Lingered in uncomfortable location     -     -     [ ]
*Pace:*
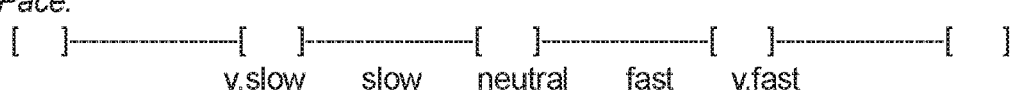
        v.slow    slow    neutral    fast    v.fast

Overall Fluidity of Motion
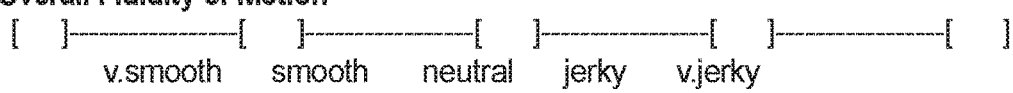
        v.smooth    smooth    neutral    jerky    v.jerky

Other
_____

FIG. 5B

SYSTEM FOR AN AUTOMATED VEHICLE

BACKGROUND

Field of the Invention

The present invention generally relates to a system for an automated vehicle. More particularly, the present invention generally relates to a system for an automated vehicle that analyzes automated vehicle behavior and alters the vehicle behavior for improved social acceptance.

Background Information

The operation of modern vehicles is becoming increasingly autonomous, causing a decrease in driver intervention. A control feature of such a modern vehicle may cause the vehicle to recognize a moving object (e.g., another vehicle), recognize location situations, and react accordingly. The recognition of moving objects and location situations may include a dimensional determination, speed, travel direction, and distance at any given moment in time. The autonomous vehicle must navigate a specific location based on certain information that may change and/or may be static for the specific location.

SUMMARY

It has been discovered that an improved system for an automated vehicle is desired. The system for the automated vehicle should be capable of navigating a location with specific predetermined information in a socially acceptable manner.

In view of the state of the known technology, one aspect of the present disclosure is to provide a system for an automated vehicle including a user input interface and an electronic controller. The electronic controller is programmed with instructions to operate at least one aspect of the automated vehicle, is configured to process information input through the user input interface, the information including data directed to predetermined parameters related to the at least one aspect of the automated vehicle at a predetermined location, and update the instructions based on the information to alter the least one aspect of the automated vehicle.

Another aspect of the present disclosure is to provide a method of operating a system for an automated vehicle, comprising inputting information into a user input interface, the information including data directed to predetermined parameters related to the at least one aspect of the automated vehicle at a predetermined location, processing with an electronic controller the information input through the user input interface, the electronic controller being programmed with instructions to operate at least one aspect of the automated vehicle, and updating, with the electronic controller, the instructions based on the information to alter the least one aspect of the automated vehicle.

BRIEF DESCRIPTION OF THE DRAWINGS

Referring now to the attached drawings which form a part of this original disclosure:

FIGS. 5A and 5B illustrate a behavior index review document;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
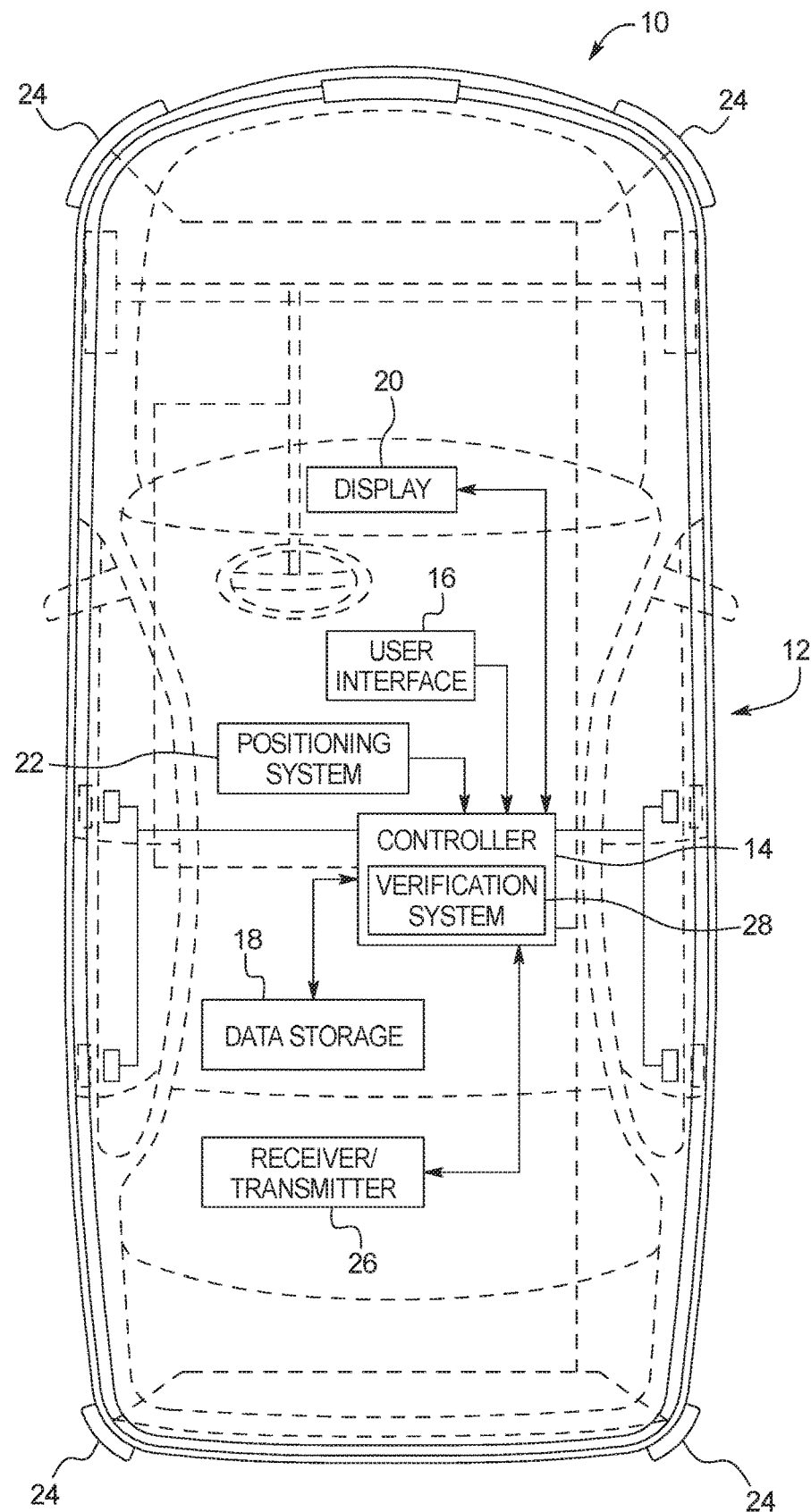
FIG. 1 illustrates a vehicle having a system for an automated vehicle according to an embodiment of the present invention.

Referring initially to FIG. 1, a system 12 for an automated vehicle 10 is illustrated in accordance with a first embodiment. The system 12 includes an electronic controller 14, a user interface 16, a memory 18 (or data storage), and a display 20. It is noted that while each of these elements can be included in the vehicle 10, some or all of the elements can be external to the vehicle 10 or connectable to the vehicle 10 or in communication (wired or wirelessly) with the vehicle 10.

For example, in one embodiment, the controller 14 can be disposed in the vehicle 10, while at least one of (some of or all of) the user interface 16, the memory 18 and the display 20 are external to the vehicle 10 and in communication with or connectable to the controller 14.

Moreover, as shown in FIG. 1, the vehicle 10 can be an automated or autonomous vehicle, and thus include any suitable device, such as but not limited to, a positioning system 22, a sensor system 24, and receiver/transmitter system 26. Thus, the vehicle 10 can use these elements, and any other suitable devices or system to navigate autonomously or partially autonomously.

The controller 14 is preferably an electronic controller 14 and includes a microcomputer with a control program that controls the system 12 as discussed below. The controller 14 can also include other conventional components such as an input interface circuit, an output interface circuit, and storage device(s) (memory 18) such as a ROM (Read Only Memory) device and a RAM (Random Access Memory) device. The microcomputer of the controller 14 is programmed to control one or more of the user interface 16, the sensor system 24, the positioning system 22, memory 18, the receiver/transmitter system 26, and the display 20, and to make determinations or decisions, as discussed herein. The memory circuit stores processing results and control programs, such as ones for the user interface 16, the sensor system 24, the positioning system 22, the memory 18, the receiver/transmitter system 26, and the display 20 operation that are run by the processor circuit. The controller 14 can be operatively coupled to the user interface 16, the sensor system 24, the positioning system 22, the memory 18, the receiver/transmitter system 26 and the display 20 in a conventional manner, as well as other electrical systems in the vehicle 10, such as the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the user interface 16, the sensor system 24, the positioning system 22, the memory 18, the receiver/transmitter system 26 and the display 20. It will be apparent to those skilled in the art from this disclosure that the precise structure and algorithms for the controller 14 can be any combination of hardware and software that will carry out the functions of the present invention.

Figure 2:
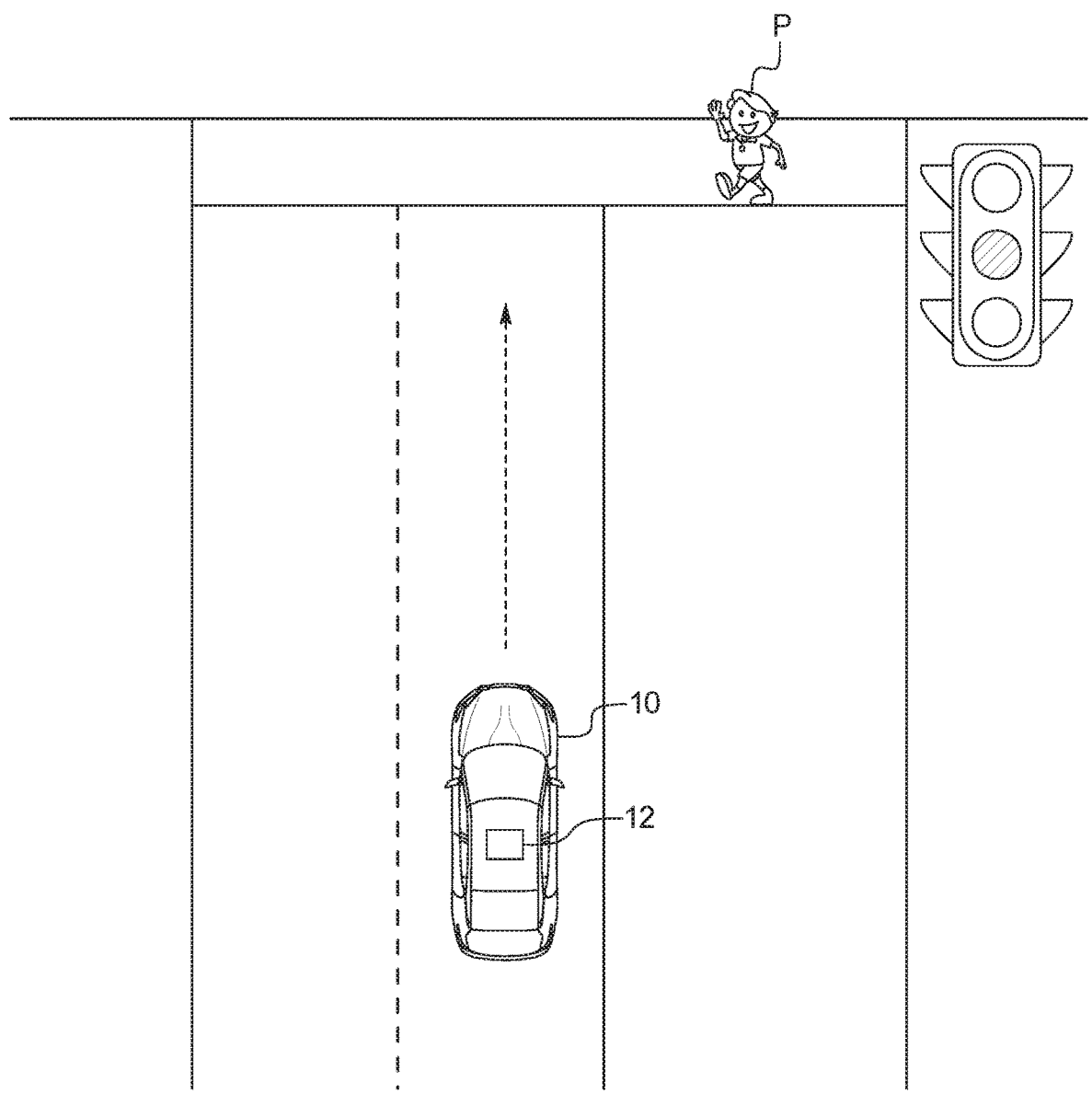
FIG. 2 illustrates the vehicle of FIG. 1 approaching a known location.
Figure 3:
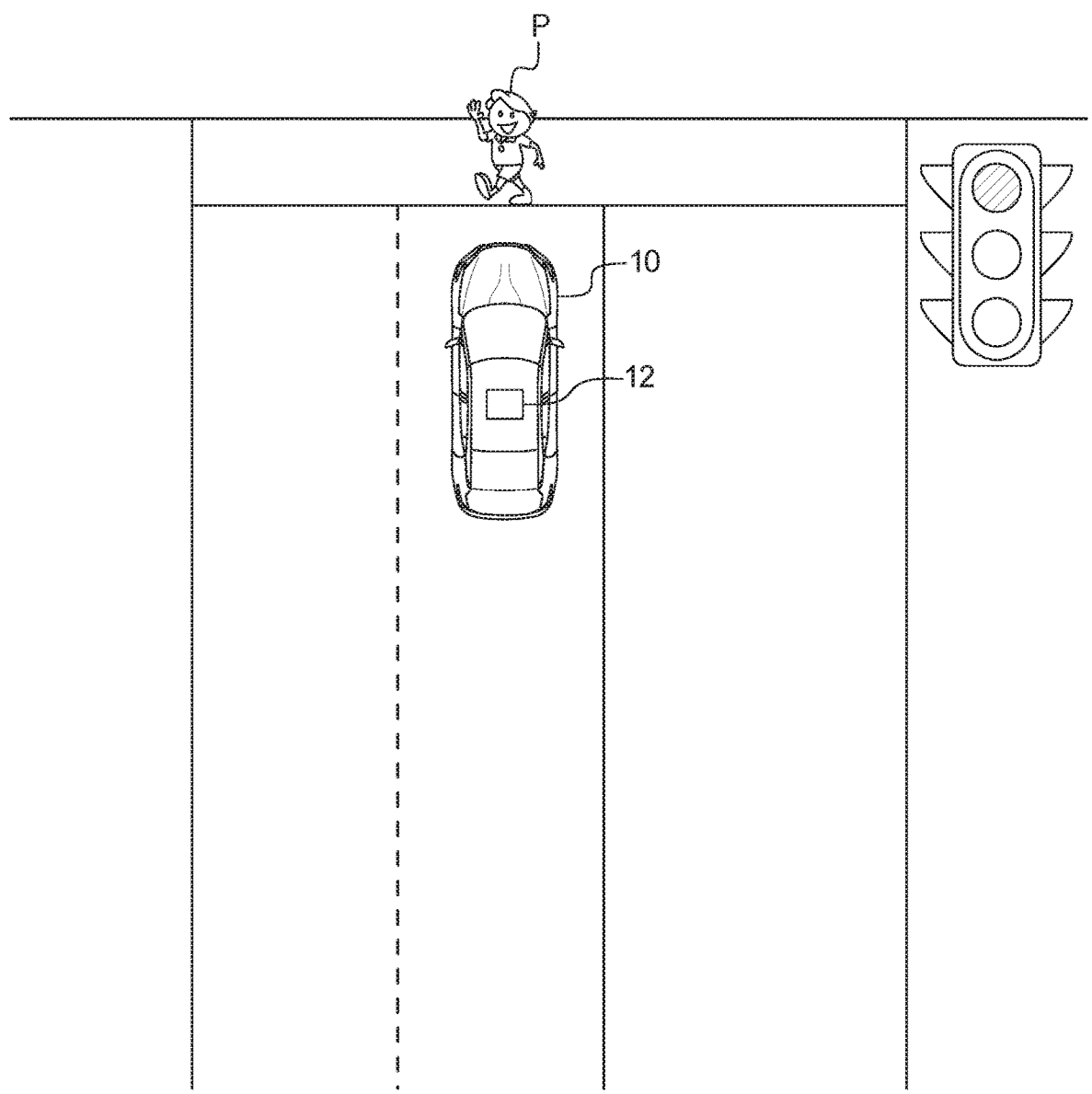
FIG. 3 illustrates the vehicle of FIG. 1 at a known location.
Figure 4:
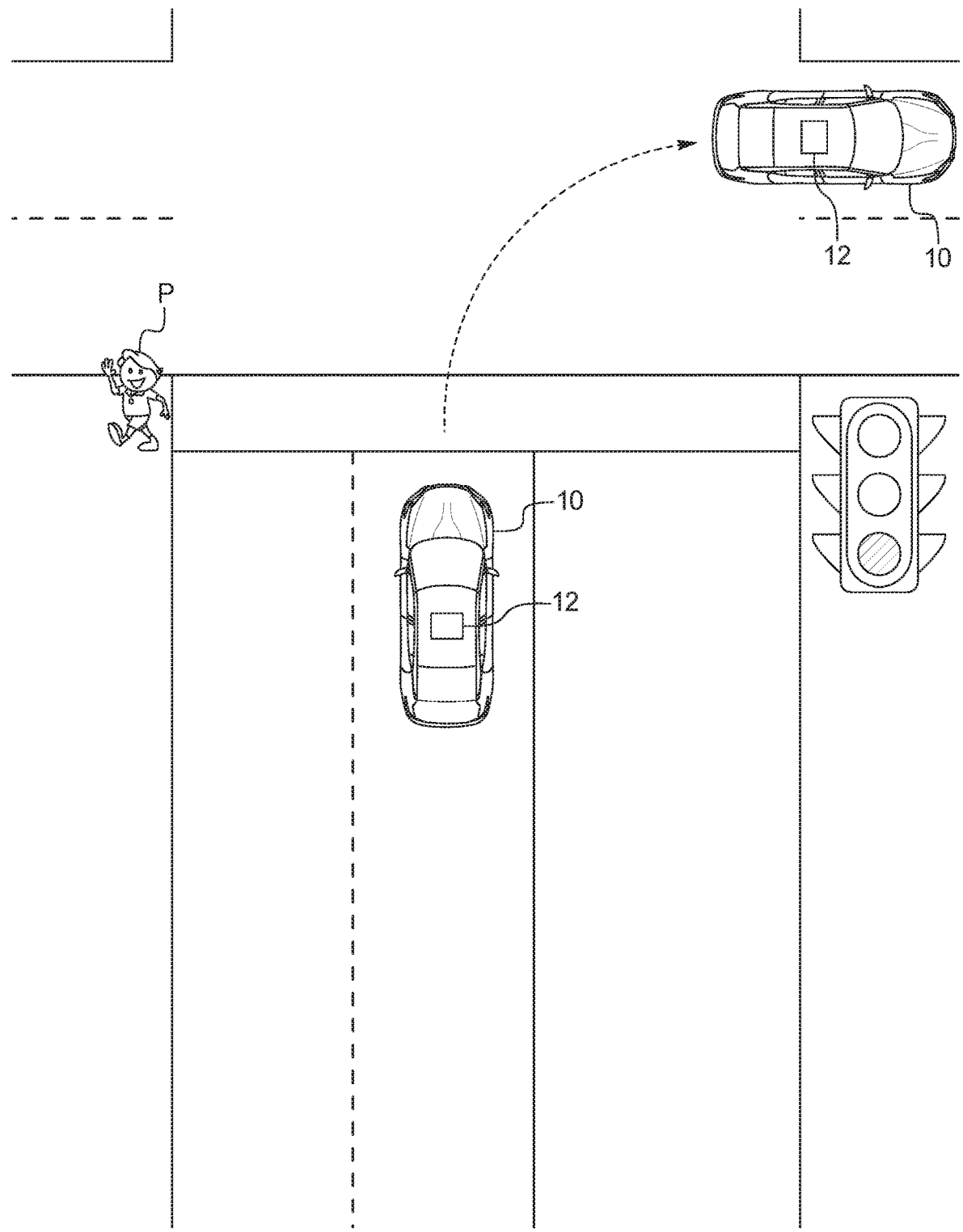
FIG. 4 illustrates the vehicle of FIG. 2 departing the known location.

FIGS. 2-4 illustrate the vehicle 10 approaching a known location, at the known location and departing the known location. Moreover, FIGS. 2-4 illustrate the vehicle 10 identifying a pedestrian (i.e., a moving obstacle) and avoiding the obstacle. As can be understood, conventional approaches to driving generally emphasize safety and adherence to traffic law. However, there can be multiple ways to navigate a location and situation safely and within the law that are perceived differently by other road users.

To achieve navigation of certain locations and/or situations, the system 12 can include a set of tuneable vehicle parameters. The system 12 can include a procedure to determine and modify or update socially acceptable vehicle parameters to adjust the perceived behavior of the vehicle 10. The system 12 accomplishes this adjustment by separating the rating of the behavior of the vehicle 10 (performed by users) from the tuning of parameters to improve that behavior (performed by the system 12), such that the users can be experts in roadway behavior rather than experts in vehicle programming. As discussed herein, the system 12 applies user data from qualitative vehicle behavior ratings to automatically modify vehicle performance, by coding that data into a set of scores that correlate to different vehicle behavior parameters. This procedure provides a development benefit for making automated vehicle control software behave appropriately and acceptably in contexts. Further integrated into a passenger-facing customization system 12, this provides an automated process that allows vehicle behavior to be tuned to an individual user's perception of what is or is not acceptable in context.

FIGS. 5A and 5B illustrate a behavior index review document on which the vehicle behavior can be scored or rated. The behavior index review document can be a ratings sheet that includes several various types of scenarios—e.g., intersections and crosswalks, obstacle avoidance, highway merges and other roadway situations. The sheets can be paper sheets or electronic pages or any suitable medium. Each sheet or page can include notes of any interacting agents, and has a set of criteria fine-tuned to the appropriateness of action in a particular scenario across consistent stages (preferably but not limited to three stages): Entering the Location; At the Location; and Leaving the Location. Each sheet can end with an overall rating of the perceived fluidity of motion in the interaction. The behavior index review document can be administered on paper or electronically, or in any suitable manner or combination thereof.

As shown in FIG. 5A, the user identifies the location of the intersection and the vehicle 10. In this example, the vehicle 10 is navigating an intersection as shown in FIGS. 2-4. As the vehicle 10 navigates in the intersection, the user identifies the interacting agents, if any, involved in the vehicle behavior. The user can identify whether the driver made an override of behavior when the vehicle 10 entered the intersection (FIG. 2), and whether the vehicle parameters for lateral and longitudinal motion were inappropriate. Additionally, the user can identify whether the overall perceived pace of interaction was too slow, too fast, or satisfactory.

Next, in relation to FIG. 3, the user identifies whether the driver was required to make an override of behavior for the vehicle 10 to stop, identify whether the vehicle parameter for stopping position was inappropriate, how length of time waiting at stop is perceived. As shown in FIG. 4, the vehicle 10 is leaving the intersection. Here, the user can indicate whether the vehicle 10 started to go out of turn, whether the driver was required to make an override of behavior passing the obstacle, and whether vehicle parameters were inappropriate, and overall perceived pace of passing. This entire section can be skipped if vehicle 10 does not come to a stop.

It is noted that while examples of behavior are indicated herein, any additional behavior can be indicated or only portions of the above described behavior can be evaluated or recorded. The examples herein are merely exemplary and not meant to limit the behavior of the vehicle 10 recorded and/or evaluated.

As shown in FIG. 5B, the user can identify acceptable behavior for obstacle avoidance. Obstacle avoidance can relate to avoidance of a pedestrian P, as shown in FIGS. 2-5 or a stationary object, or a moving object (e.g., a remote vehicle or bicycle), or any other desired object. In this example, the user identifies the location of the obstacle and the vehicle 10. The user also identifies the interacting agents, i.e., the pedestrian P or any other obstacles, involved in the behavior. Similarly to as described above, the user can identify whether the driver made an override of behavior while the vehicle 10 is approaching the obstacle (FIG. 2), and whether the vehicle parameters for lateral and longitudinal motion were inappropriate. Additionally, the user can identify whether the overall perceived pace of interaction was too slow, too fast, or satisfactory.

Next, in relation to FIG. 3, the user identifies whether the driver was required to make an override of behavior for the vehicle stop to avoid the obstacle (i.e., pedestrian P), if necessary, identify whether the vehicle parameter for stopping position was inappropriate, how length of time waiting at stop is perceived. As shown in FIG. 4, the vehicle 10 is passing the obstacle (i.e., pedestrian P). Here, the user can indicate whether the vehicle 10 started to go out of turn, whether the driver was required to make an override of behavior passing the obstacle (i.e., pedestrian P), and whether vehicle parameters were inappropriate, and overall perception of the pace of passing. This entire section can be skipped if vehicle 10 does not come to a stop.

It is noted that while examples of behavior are indicated herein, any additional behavior can be indicated or only portions of the above described behavior can be evaluated or recorded. The examples herein are merely exemplary and not meant to limit the behavior of the vehicle 10 recorded and/or evaluated.

Figure 6:
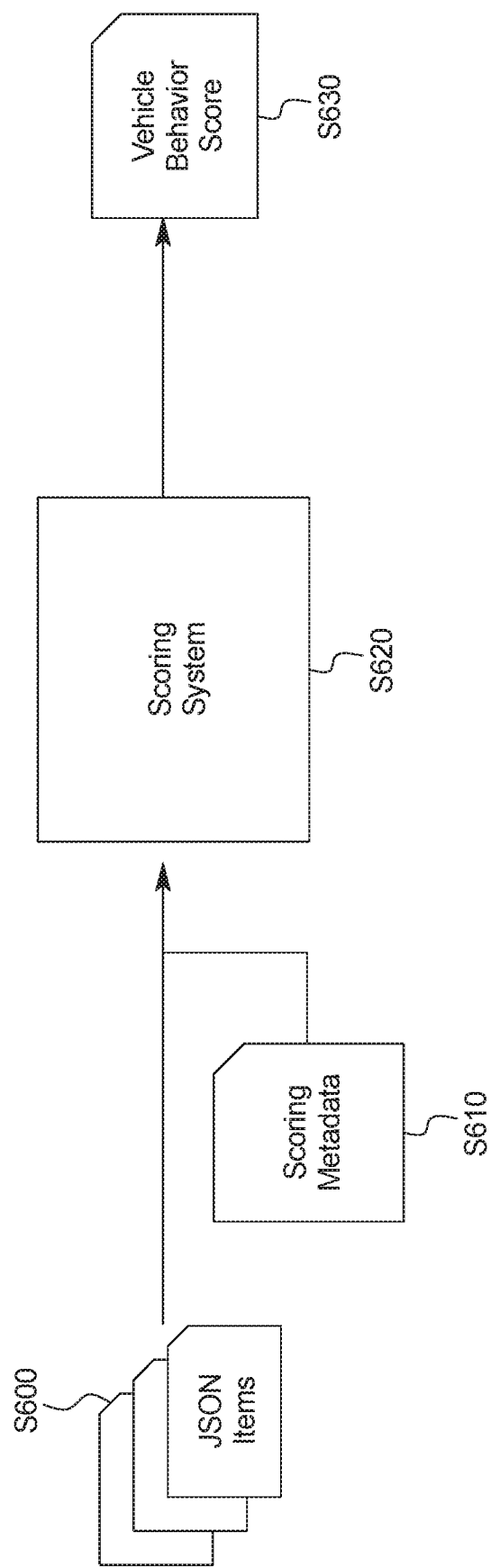
FIG. 6 illustrates a scoring process that is entered into the system for an automated vehicle illustrated in FIG. 1.

Paper or electronic ratings sheets used in the vehicle 10 are reformatted into a standardized data format, e.g. JSON, SQL, XML. (In the examples discussed herein JSON is used). As shown in FIG. 6, in step S600, the controller 14 takes as input a set of rider ratings in JSON format and scoring metadata in step S610. The controller 14 calculates the score in step S620 and outputs a Vehicle Behavior Score in step S630 that can be used to identify how vehicle behaviors and parameters should be changed to improve human ratings. The vehicle behavior score has a number of sections, as discussed below, that cross-correlate the individual ratings items for particular situations and allow more general identification of adequate/inadequate driving behaviors. The scoring metadata contains information about the kind of intersection or road situation represented by the alphanumeric location code (e.g. "crosswalk," "uncontrolled intersection," "controlled intersection," "merge"). The scoring metadata can include any predetermined information about the context of the location that is being scored. The scoring metadata can also include, if desired, data about the raters themselves, e.g., whether the rater is a novice or experienced or any other suitable information. The vehicle behavior score can be stored as a JSON file, which can then be interpreted by the controller 14 to alter the vehicle parameters.

As shown below in Table 1, the JSON format codes each checkbox as a Boolean value, and each scale as a 1-5 valued integer, e.g. a Likert scale.

TABLE 1

JSON Data Example

| JSON Format: | Explanation |
|---|---|
| anItem = { | A JSON rating item |
|   location: "D4" | The alphanumeric code location of the observation. |
|   interacting_agents: [ ] | An empty list signifies no interacting agents. |
|   entering: { | |
|     e_override: False | No override on entry. |
|     e_steering: False | No steering problem on entry. |
|     e_longitudinal: True | A longitudinal movement problem on entry. |
|     e_pace: 4} | Entry pace described as fast". |
|   at: { | |
|     a_override: False | No override at inte"rsection. |
|     a_location: True | A problem with stop location. |
|     a_pace: 3} | Pace of stopping described as "neutral". |
|   leaving: { | |
|     l_override: True | A driver override leaving situation. |
|     l_steering: False | No steering issue identified. |
|     l_stopgo: False | No stop/go issue identified. |
|     l_lingered: True | A problem lingering in an inappropriate roadway location. |
|     l_pace: 1 | Pace leaving identified as "very slow". |
|     l_outoftum: False} | Vehicle did not go out of turn. |
|   fluidity: 2 | Overall fluidity rated as "smooth". |
|   other: "" | No other qualitative comments noted. |
| } | |

These JSON response files are then consumed by the controller 14, which produces binned or collated results that are useful to the behavior tuning system 12.

Alphanumeric identifiers (e.g. A6) can be used for each location/situation. These alphanumeric identifiers can be as long as necessary to differentiate all situations needed, or could any other suitable form. The metadata for each location/situation can include the ID, intersection or situation type, and can include a number of other predetermined parameters or information, including but not limited to geocoordinates, time of day, weight factor, and special contextual parameters (occlusion, vegetation, etc). The weight factor defaults to 1 if absent, and is used to denote intersections which could strongly impact vehicle behavior. Special parameters can include particular features of the intersection that can be used to provide more specific behavior recommendations.

As shown in Table 2 below, scoring metadata identifies the kinds of situations.

TABLE 2

| ID | Intersection Type | Coordinates | Time-Of-Day | Weight | Special Parameters |
|---|---|---|---|---|---|
| A1 | controlled intersection | 47.330, 50.176 | 13:45 | 1 | occlusion |
| A2# | controlled intersection | | | | |
| A3 | uncontrolled intersection | | | | |
| A4 | crosswalk | | | | |
| A5 | controlled intersection | | | | |
| A6 | uncontrolled intersection | | | | |
| ... | | | | | |
| D1 | crosswalk | | | | |
| D2 | controlled intersection | | | | |
| D3 | uncontrolled intersection | | | | |
| D4 | uncontrolled intersection | | | | |
| D5 | crosswalk | | | | |

Table 3 illustrates four locations/situations that are scored.

TABLE 3

| item1 = { | item2 = { | item3 = { | item4 = { |
|---|---|---|---|
| location: "D4" | location: "D4" | location: "A6" | location: "A6" |
| interacting_agents: ["vehicle"] | interacting agents: [ ] | interacting agents: ["bike"] | interacting agents: [ ] |
| entering: { | entering: { | entering: { | entering: { |
| e_override: True | e_override: False | e_override: False | e_override: False |
| e_steering: True | e_steering: False | e_steering: False | e_steering: False |
| e_longitudinal: False | e_longitudinal: True | e_longitudinal: False | e_longitudinal: False |
| e_pace: 4} | e_pace: 4} | e_pace: 2} | e_pace: 3} |
| at: { | at: { | at: { | at: { |
| a_override: False | a_override: False | a_override: True | a_override: False |
| a_location: True | a_location: True | a_location: False | a_location: False |
| a_pace: 3 | a_pace: 3} | a_pace: 5} | a_pace: 3} |
| leaving: { | leaving: { | leaving: { | leaving: { |
| l_override: False | l_override: True | l_override: True | l_override: False |
| l_steering: True | l_steering: False | l_steering: False | l_steering: False |
| l_stopgo: True | l_stopgo: False | l_stopgo: False | l_stopgo: False |
| l_lingered: False | l_lingered: True | l_lingered: False | l_lingered: False |
| l_pace: 3 | l_pace: 1 | l_pace: 3 | l_pace: 4 |
| l_outoftum: False} | l_outoftum: False} | l_outoftum: True} | l_outoftum: False } |
| fluidity: 4 | fluidity: 2 | fluidity: 4 | fluidity: 3 |
| other: "driver corrected steering away from oncoming vehicle because intersection space was tight" | other: "" | other: "" | other: "" |

Figure 7:
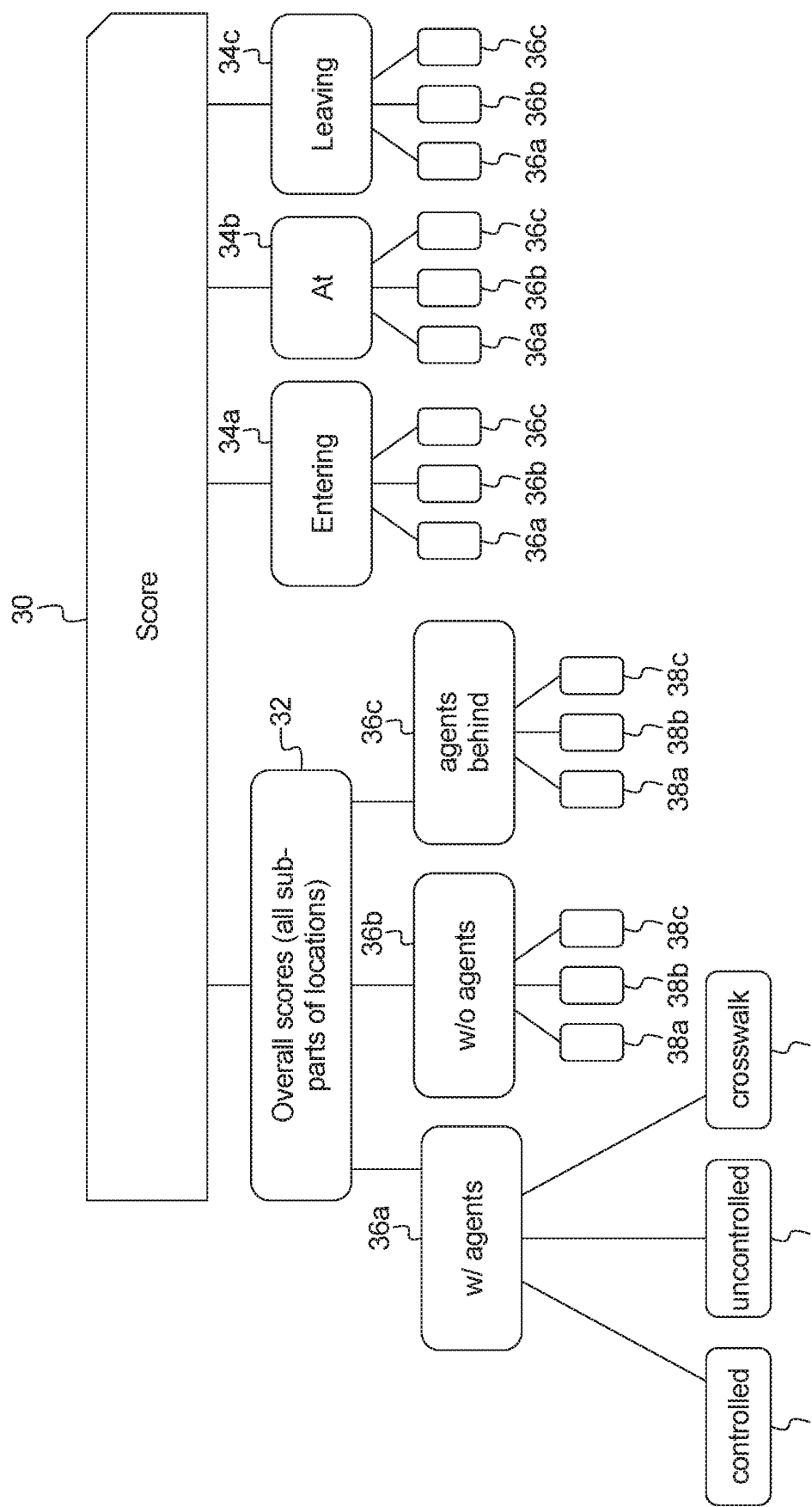
FIG. 7 illustrates data stored as a parameters in branching tree structure.

As shown in FIG. 7, the data can be stored as a parameters in branching tree structure, with an overall score 30 record split first by sub-parts of a location 32 and situation (entering 34a, at 34b and leaving 34c); then by agent conditions (with agents 36a, without agents 36b and agents behind 36c); then by type of location/situation (e.g., controller 38a, uncontrolled 38b, crosswalk 38c,). In this embodiment, three types of locations/situations (i.e., controlled, uncontrolled, or crosswalk) are illustrated; however, as can be understood, any number of locations/situations can be used, including "special parameters", as discussed herein. If sufficient data is available the branching tree structure can be extended further, e.g. special parameters used to subdivide each of the controlled/uncontrolled/crosswalk categories. Moreover, the situation (entering 34a, at 34b and leaving 34c) can be broken down into subcategories in the same manner as the location 32.

As can be understood, the behavior score can include a variety of collations of the raw ratings collected into 4 main categories for the three different interactions stages (entering, at, leaving) and the averaged case for all interactions combined. Each of these is subdivided as illustrated in FIG. 7. The 9 categories used to subdivide are generated out of a 3×N matrix of the 3 road-user conditions (without-interacting-agents, with agents, and with agents behind the AV), and N primary intersection types (in this case we use 3: crosswalk, controlled, and uncontrolled). Therefore, for example, the overall pace is the average of all paces for all road user conditions and all interaction types: average (4,4,2,3,3,3,5, 3,3,1,3,4) from all four items in Table 2. All items have weights of 1, so a straight average can be used. However, as can be understood, if there is non-unity weights, a weighted average can be used.

The pace without agents is the average of all paces for all interaction types where there were no agents: thus average (4,3,3,3,1,4). In this calculation, only item 2 and item4 from Table 3 are used. The uncontrolled without-agents pace is the average of all paces for uncontrolled interaction types in situations without other agents, so in this case it is the same as the previous since both item 2 and item 4 are records from uncontrolled intersections.

The controlled and crosswalk entries are omitted because all values are "null" since no such data was in the scoring set. The paces with-agents, and with-agents-behind are likewise subdivided into uncontrolled, controlled, and crosswalk categories, which will be null where there is no data.

The overall pace entered is the average of all entering paces for all interaction types in all road-user conditions: so that is average(4,4,2,3) using all four items in Table 3. The entering pace without is the average of 4 and 3, or 3.5, from item 2 and item 4. The entering pace with agents would be the average of 4 and 2, or 3, since this calculation is from item 1 and item 3.

The entering paces with and without agents can be further subdivided into uncontrolled, controlled, and crosswalk situations as the overall pace is above. In this situation, however all values for controlled and crosswalk interactions will be "null" because no data was in the scoring set.

The At and Leaving sections follows the same format, but, as can be understood, only uses data only from either At or Leaving sections of the scoring items on the previous page. Not all vehicle parameters are necessarily tuned in the same way. However, many parameters can be tuned as discussed below, which can use a broad situation-based tuning. These parameters can include, but are not limited to: Max acceleration, Max deceleration, Max angular acceleration, Distance between planned stop location and stop line, Trajectory displacement for other road users, Acceleration damping, Deceleration damping, Angular acceleration damping, Overall damping, Turn order uncertainty threshold, Obstacle buffer, and Passing threshold.

As illustrated in Table 4, each parameter can be initiated with a default overall value, a step size, and safe max-min boundaries within which the value is capable of varying. The default value is set by the vehicle's current behavior. The minimum and maximum are applied by the programmer and prevent rater desires from moving parameters into regions that would be undesirable. The step-size acts as a scale factor to relate issues in the scores to changes to the parameters, which each have a different size or type of units. It also accounts for the difference in scoring Likert and Boolean variables.

Each parameter can be initiated with a threshold, which defines the minimum variation from ideal score required to adjust the parameter. This is to prevent the system 12 from hunting forever for a solution. If scores differ from perfect by no more than the threshold value for a parameter, that parameter remains unchanged.

TABLE 4

| Parameter | Overall | Threshold | Step-size | Maximum | Minimum |
|---|---|---|---|---|---|
| Max acceleration | Z | T | dX | X_1 | X_2 |
| ... | | | | | |

Each of these parameters is duplicated across all cases for which the parameter tuning is intended to occur, the 3×N matrix from before. The base categories and all their combinations can be stored, so in a nine category example, there are twelve versions of each parameter

| | |
|---|---|
| no interactants | (1) |
| crosswalk | (2) |
| uncontrolled intersection | (3) |
| controlled intersection | (4) |
| interactants ahead | (5) |
| 3 sub-versions | (6-8) |
| interactants behind | (9) |
| 3 sub-versions | (10-12) |

The step size and max-min values remain the same across all examples. But now there are 12 condition-specific perturbations, or deltas, that are capable of being varied with the tuning inputs from user ratings. These are combined with the default value to produce the right value for any situation. In this embodiment, all deltas begin as 0; however, it is noted that deltas can begin at any desired value.

Table 5 shows one embodiment, in which the max acceleration is initialized.

TABLE 5

| Parameter | Overall | Thresh | Step-size | Max | Min | No Interactants | No Inter, Uncontrld | No Inter, Contrld | No Inter, Crosswalk | Interactants Behind | ... |
|---|---|---|---|---|---|---|---|---|---|---|---|
| Max accel | X | T | dX | X_1 | X_2 | 0 | 0 | 0 | 0 | 0 | ... |
| ... | | | | | | | | | | | |

In this embodiment, after a round of updates, several of these values will change. See Table 6. New values can be shifted in the updating process: the default itself can move slightly, and U, V, W, Y,Z will all be small positive or negative numbers (e.g. 0.25; or ×0.333333).

TABLE 6

| Parameter | Overall | Thresh | Step-size | Max | Min | No Interactants | No Inter, Uncontrld | No Inter, Contrld | No Inter, Crosswalk | Interactants Behind | ... |
|---|---|---|---|---|---|---|---|---|---|---|---|
| Max accel | X | T | dX | X_1 | X_2 | U | V | W | Y | Z | ... |
| ... | | | | | | | | | | | |

As can be understood, each score may not map directly or uniquely onto one parameter. Accordingly, the controller 14 can be programmed to connect scores to the appropriate parameters. That is, the mapping procedure can be programmed or stored in the system 12, such that for any score (such as Pace), the parameters that need to be varied with that score (such as Maximum Acceleration, and Overall Damping) can be looked up.

For example, Mapping:

```
{
  pace: ["max_accel", "overall_damping"],
  fluidity: ["overall_damping", "max_decel", "max_angular_acc"]
  e_pace: ["max_decel", "decel_damping"]
  l_pace: ["accel_damping" ]
  ...
}
```

As can be understood, this procedure can be followed for other scores and parameters. These are merely examples, and can be modified or altered depending on how the system 12.

The parameter tuning process can start with the score update data discussed above. The overrides and the inappropriate passing side flag as recorded can be used for follow-up by engineers, if desired. The remainder of the score data is used by the controller 14 to update the parameter values inside of the parameter matrix.

In one embodiment, the parameter tuning for each parameter can occur in two steps. First, the overall value of the parameter is updated using the averaged value, if one exists. Then, each individual condition-specific delta is updated using the specific values in the score output. Preferably, enough rating data are required to provide representative data in each score category; e.g. at least 10 situations with a given set of conditions, however any desired amount of data can be used.

Table 7 illustrates an example of parameter tuning. In this example, the overall pace is scored as 3.17, or slightly fast given an ideal pace value of 3. The controller 14 can compare this value against the threshold for each parameter it effects.

TABLE 7

| Parameter | Overall | Threshold | Step-size | Maximum | Minimum |
|---|---|---|---|---|---|
| Max acceleration | 4.5 | 0.15 | −0.5 | 6 | 3 |
| Overall damping | 0.25 | 0.15 | 0.02 | 0.05 | 0.1 |

As stated, the pace is 3.17. Therefore, the difference between ideal and measured pace is 0.17. This is above the threshold of 0.15. So the controller 14 can change the default values, in each case by 0.17× (the step size) unless this exceeds the maximum or minimum value. Table 8 illustrates the updated values.

TABLE 8

| Parameter | Overall | Threshold | Step-size | Maximum | Minimum |
|---|---|---|---|---|---|
| Max acceleration | 4.415 | 0.15 | −0.5 | 6 | 3 |
| Overall damping | 0.2534 | 0.15 | 0.02 | 0.5 | 0.1 |

The same process can be repeated for each condition-specific perturbation, while adjusting for the shift in the default value that has already been made. Using the max acceleration above as the example:

The pace without-agents does not need to be changed, but it has already been shifted by the default value shifting down by 0.085. So the No Interactants value changes from 0 to positive 0.085.

The controlled, uncontrolled, and crosswalk pace within the without-agents condition does not need to be changed because the values are either the same as that in case above or null.

The pace with-agents is too fast, at 3.33. So a shift to these values is required. It is calculated as 0.33*(−0.5)− (−0.085)=−0.08. This is the adjustment times the step size, minus the prior correction. So this conditions-specific perturbation takes the value −0.08.

The basic parameter tuning model demonstrated alters the parameters by a function of a fixed step-size on each round if they exceed a certain threshold value, but keeps the parameters within safe pre-set boundaries. However, tuning could be done using a machine-learning based model.

One example of a parameter tuning model can involve reinforcement learning over the above values, discussed here as a Markov decision process. In this embodiment, the agent can be the Parameter Tuner, with a parameter state-space, and the environment being a real-world performance of the parameters as measured by human ratings. The human can act as an interpreter that scores the results of each action the agent takes and feeds these scores back to the agent as a reward function, in the same way that scores were fed back to the basic tuning model described previously.

In this embodiment a policy that maximizes the reward of the real-time performance of the vehicle 10 is desired. Such a policy p will alter the state of the parameters N so as to ensure best performance in the environment. In other words, to move the system state S, recorded in terms of the real-world performance, toward optimal scores.

During each round of updates, the agent can take a set of actions A, that involve increasing or decreasing different parameters N, which probabilistically impact the agent's state.

Once updates are made, the parameters are used to drive the vehicle 10 in the real-world and feedback from human raters is fed back into the controller 14 as an update to the state, with associated rewards for improving the state. Then the policy is updated based on the reward, the parameters are updated again via actions, and the whole process repeats.

S=set of environment and agent states, measured by performance in terms of the scoring matrix A=set of actions agent can take, increasing or decreasing parameters N that correlate to a particular performance state s p=probability of transition from s to s' under action a R=reward for transition from s to s'

The state transitions p are initialized using probabilities derived from the score-to-parameter mapping that is used for the deterministic version of the tuning process: combinations present in that mapping get high probabilities. All other combinations get uniform, low probabilities. In this manner preexisting knowledge about the effects of parameters on the behavior of the system 12 is preserved, but the learning agent is able to update knowledge based on present experience, potentially discovering important connections between parameters that are not part of the basic deterministic tuning process.

Figure 8:
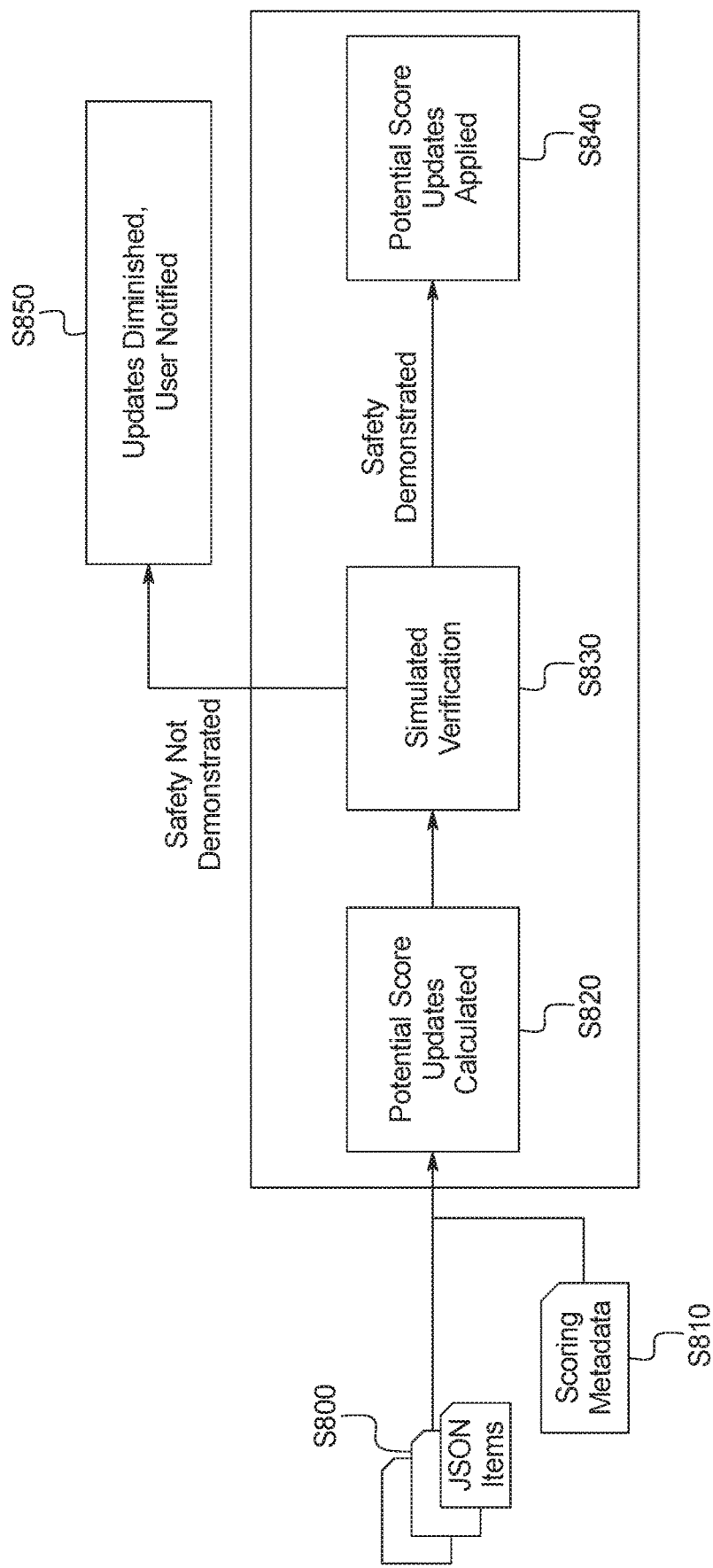
FIG. 8 illustrates a process of for upgrades to a parameter.

Another improvement involves verifying planned perturbations to the parameters using vehicle simulation models. Instead of updating the values based on human feedback unless they hit a maximum or minimum, the min-max constraints could be relaxed if the scoring process is able to use the real-time vehicle data to simulate changes in parameters before actually making those changes, as shown in FIG. 8.

In this embodiment, the user enters information related to the situation (e.g., the system 12 controlled the vehicle 10 in a manner that was not satisfactory—vehicle 10 too slow to accelerate). In step S800 the information entered by the user is encoded as a JSON item. In step S810, associated metadata including but not limited to vehicle behavior and the type of intersection stored in the memory 18 is retrieved. In step S820, the potential score updates are calculated by the controller 14. In this embodiment, the controller 14 can be programmed with a verification system 28 that intakes the updated information and determines whether a faster acceleration would have exceeded any risk thresholds for the vehicle 10 in that context in step S830. If the controller 14 determines that a faster acceleration would not have exceeded any risk thresholds for the vehicle 10, the potential score updates are applied in step S840. If a faster acceleration would have exceeded any risk thresholds for the vehicle 10, the controller 14 can diminish the updates and notify the user in step S850 via the display 20. Thus as can be understood, the verification system 28 can perform simulated tests of the parameter change in dozens of regression-test cases and determine whether such a change is safe. In this way the maximum and minimum safe values, which exist to ensure vehicle safety, can be widened, since the verification system 28 within the real-time scoring process checks changes requested by the human against actual simulations to ensure their safety. If the change does not appear safe, the verification system notifies the user (via, e.g., the display 20) and can apply a reduced amount of parameter change that does verify as safe, or can be set to reject the changes altogether. However, as shown in FIG. 8, if safety is demonstrated, the potential score updates can be applied.

In one embodiment, the system 12 can provide include a real-time rating process. A real-time rating process can involve two key advances:

1. Behaviors can be tuned "on-the-fly" based on rider feedback; and

2. All vehicle data is available to identify what precisely caused the issue, and therefore to more effectively alter the necessary parameters in context.

Such a real-time process involves an interactive application (via touch screen, buttons, or some other modality or user input device). Moreover, this interactive application may be vastly simplified as a way to simply annotate a training set (OK, not-OK buttons; or "Acceptable", "Uncomfortable", and "Unsafe") for a different approach to vehicle behavior using deep learning, for instance, to learn how to drive in particular instances.

Figure 9:
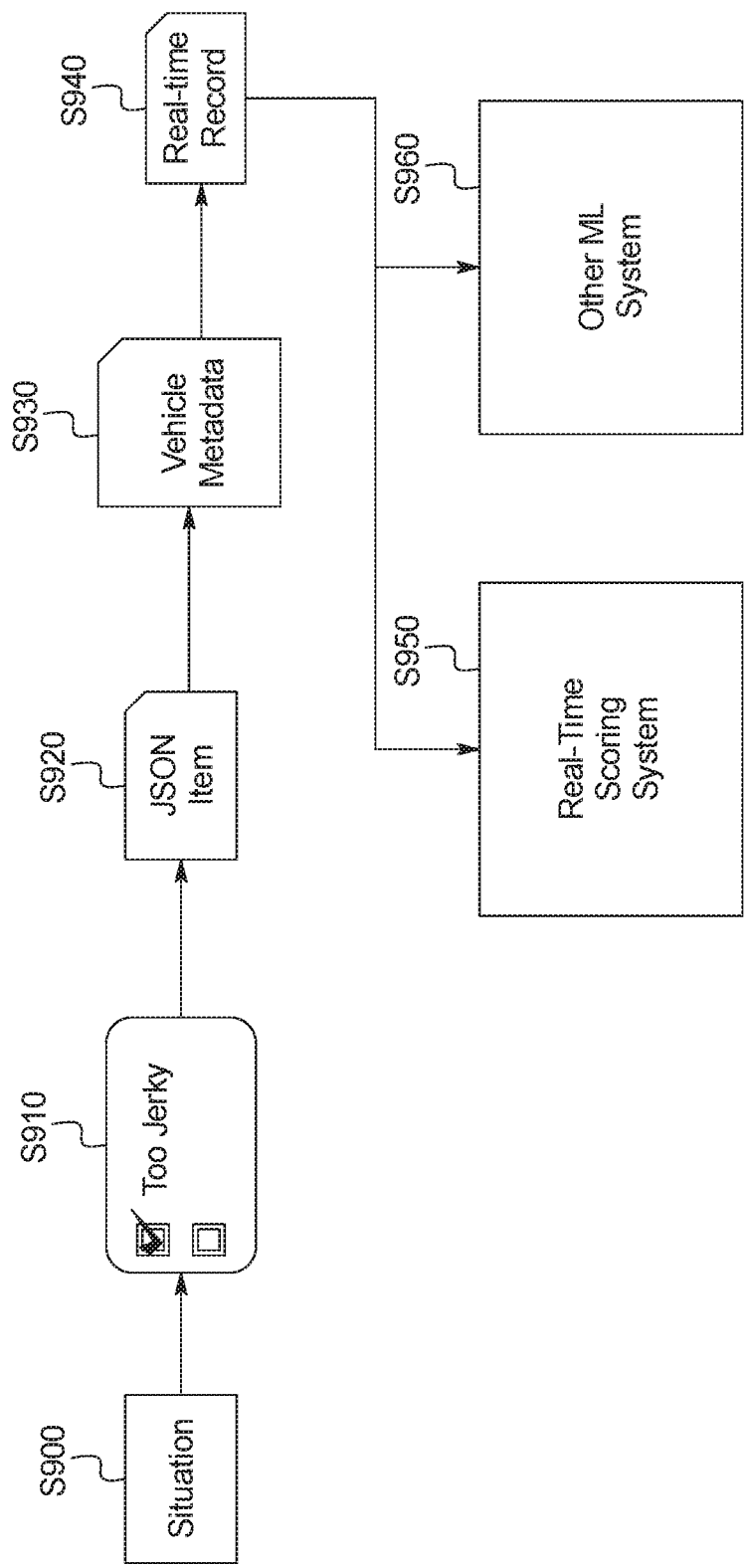
FIG. 9 illustrates a process for a real time scoring updates.

FIG. 9 illustrates a procedure that involves a real-time rating process for an automated vehicle 10. In step S900 the vehicle 10 encounters a situation. In step S910, the user enters information related to the situation (e.g., the system 12 controlled the vehicle 10 in a manner that was not satisfactory—"too jerky"). In step S920, the information entered by the user is encoded as a JSON item. In step S930, associated metadata including but not limited to vehicle behavior, camera, sensor system 24 (e.g., Lidar) data, type of intersection stored in the memory 18 is retrieved. In step S940 a collection of real-time records are used as the input and stored in the new scoring process in step S950. These real-time records can be processed either individually in real time, or in batches using the previously discussed scoring process. Alternatively, the real-time records can be stored and used as input to another ML system in step S960, such as a deep learning end-to-end learning system that uses vehicle behavior and ratings directly to identify how to drive.

The real-time scoring process can differ from the above scoring process in that the real-time scoring process takes records individually, and updates the vehicle behavior parameters after each situation rather than once a statistically significant number of items can be binned together. The data structure and basic premise is the same as before, but the need to process records changes the way that updates are performed.

Table 9 illustrates a max acceleration update for a real time scoring process, similar to as described above.

TABLE 9

| Parameter | Overall | C1 | Step-size | Max | Min | No Interactants | C2 | No Inter, Uncontrld | C3 | No Inter, Crosswalk | C4 |
|---|---|---|---|---|---|---|---|---|---|---|---|
| Max accel | X | 0 | dX | X_1 | X_2 | U | 0 | V | 0 | W | 0 |

As can be understood, the addition of sensor system 24 data and camera data enables new types of situations to be identified and placed into new columns (rather than simply intersection types as shown previously). In one embodiment, the threshold can be removed and not used. Instead, as shown, a number of Count columns can be added, one for each condition. Each time the scoring process identifies that a parameter's value may need to change based on human feedback, it either adds or subtracts to a count or zeroes it out.

Table 10 illustrates the situation that results when overall acceleration is identified as too slow (recorded as 1), but the No Interactants case and the No Interactants case at Uncontrolled Intersections were identified as too fast (each becomes−1). The No Interactions case at Crosswalks was neither too slow nor too fast (recorded as 0).

TABLE 10

| Parameter | Overall | C1 | Step-size | Max | Min | No Interactants | C2 | No Inter, Uncontrld | C3 | No Inter, Crosswalk | C4 | ... |
|---|---|---|---|---|---|---|---|---|---|---|---|---|
| Max accel ... | X | 1 | dX | X_1 | X_2 | U | −1 | V | −1 | W | 0 | |

If further scores moved these values in the same directions, the numbers would accumulate to +2 and −2 etc. If the next change reversed the trend (e.g. overall pace was then too fast), the count values will drop back to 0 and begin counting again.

Two alternatives can be used for altering the parameter values themselves (X, U, V, W above) based on counts. In a Fast Update mode, the parameter can be changed every time the count is changed by (Count)*(Step-Size), or 1*(Step-Size) if the count resets to zero. In Stable Update mode, the parameter can be changed only when the absolute value of the count is greater than a set value (e.g. 3) and only by a single step-size. In stable mode, values are not changed when the count resets to zero. Fast Update mode can only be used for brief periods to rapidly change values, but will tend to overshoot and require further tuning in Stable Mode.

One improvement that real-time scoring produces in with when a Markov Decision Process or other ML version of the updating algorithm, similar to the embodiments discussed herein. As can be understood, such a system 12 can produce a benefit when a properly tuned the system 12 discovers connections between parameters that are not encoded in the updating mapping developed manually.

Another improvement involves model-checked perturbations using vehicle simulation. Instead of updating the values based on human feedback unless they hit a maximum or minimum, the min-max constraints could be relaxed if the scoring process is able to use the real-time vehicle data to simulate changes in parameters before actually making those changes.

Figure 10:
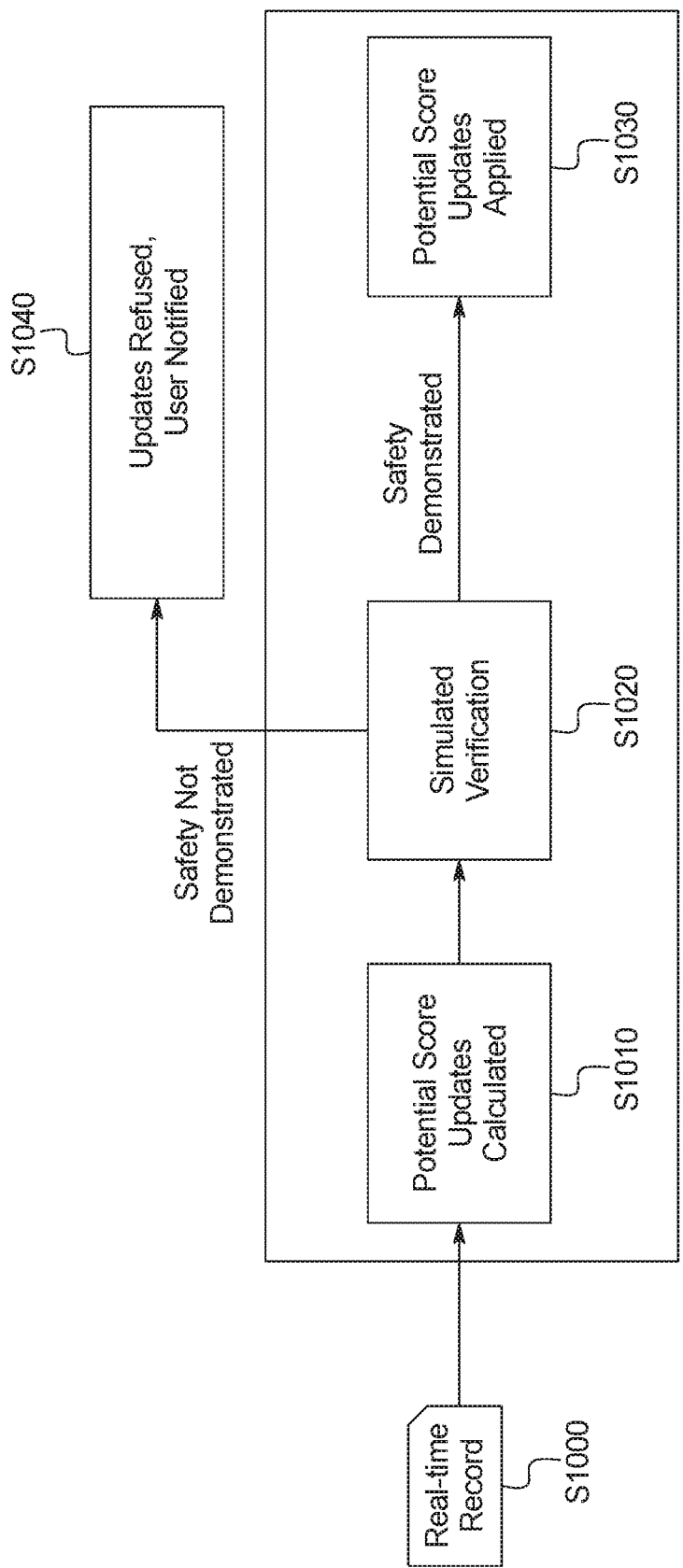
FIG. 10 illustrates upgrades to real time scoring.

For example, as shown in FIG. 10, in step S1000 a real time record is recorded (e.g., the vehicle 10 is identified as being too slow to accelerate in a particular situation). This real time record can be recorded in any manner desired, such the sensor system 24 data and camera data for the scene. In step S1010, the potential score updates are calculated by the controller 14. In this embodiment, the controller 14 can be include the verification system 28 that intakes the sensor system 28 data and camera data for the scene, creates a simulation of the scene, and determines whether a faster acceleration would have exceeded any risk thresholds for the vehicle 10 in that context in step S1020. If the controller 14 determines that a faster acceleration would not have exceeded any risk thresholds for the vehicle 10, the potential score updates are applied in step S1030. If a faster acceleration would have exceeded any risk thresholds for the vehicle 10, the controller 14 can notify the user in step S1040 via the display 20. That is, the controller 14 can notify the user that the update was not performed and the reason for that refusal.

Such a verification system 28 can also be capable of quickly running a parameter change in half a dozen regression-test cases, similar to the non-real-time case, and determine whether a change that is safe in this particular situation would be unsafe in certain other cases identified by the designers as particularly important. In this manner, the maximum and minimum safe values, which exist to ensure vehicle safety, can be widened somewhat, since the verification system within the real-time scoring process is checking changes requested by the human against actual simulations to ensure their safety.

Figure 11:
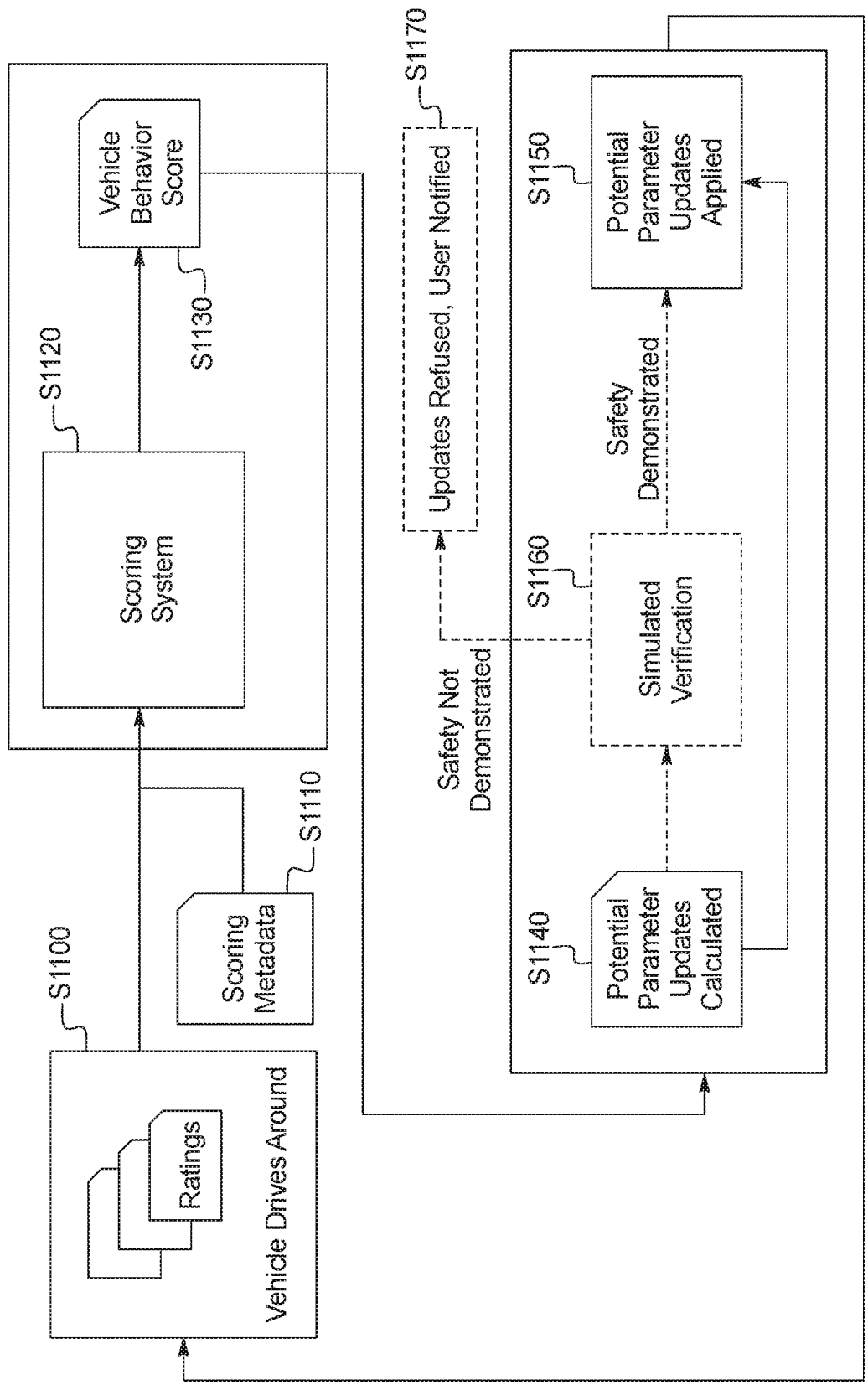
FIG. 11 illustrates the process for updating the parameter.

FIG. 11 illustrates a method of operating a system 12 for an automated vehicle 10. In step S1100, the vehicle 10 approaches, is at and/or leaves a location situation, simultaneously, data regarding the vehicle performance is entered or accumulated. In step S1110 metadata is retrieved by the controller 14 from the storage device. The data regarding the vehicles performance and the metadata are entered into the scoring process in step S1120. The controller 14 in the scoring process calculates a vehicle behavior score in step S1130. If desire, this score can be displayed on the display 20. The controller 14 then determines or calculates the potential parameter updates in step S1140 and display the updates on the display 20, if desired.

In one embodiment, the potential parameter updates can be applied in step S1150 to result in vehicle behavior tuning. The vehicle 10 can then approach another situation. In another embodiment, in step S1160, the potential parameter updates can be run in the verification system 28 of the controller 14 to determine simulated verification. If the controller 14 determines that the updates are safely demonstrated, the potential parameter updates are applied in step S1150. If the controller 14 determines that the updates are not safely demonstrated, the controller 14 can notify the user in step S1170 that the updates have been refused via the display 20. That is, the controller 14 can notify the user that the update was not performed and the reason for that refusal.

Figure 12:
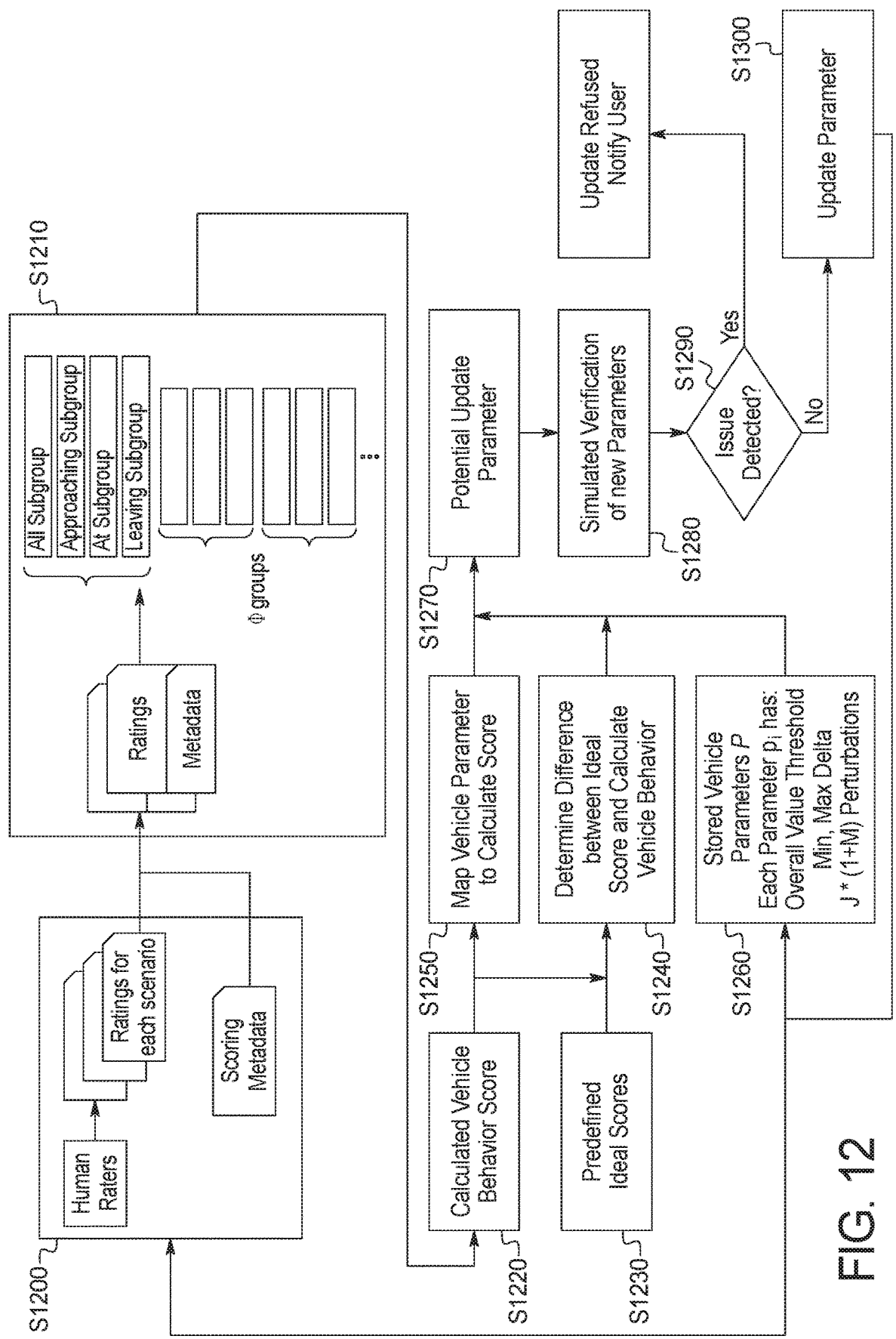
FIG. 12 illustrates a more detailed process for updating the parameter.

FIG. 12 illustrates a method of operating a system 12 for an automated vehicle 10. In step S1200, the vehicle 10 approaches, is at and/or leaves a location situation (i.e., is involved in dynamic testing for a scenario). Here, the vehicle performance is entered, along with the scenario metadata. In one embodiment, the scenario data can be calculated as follows:

S=set of all scenario data $S_n \in S$, a particular "scenario" (e.g. one intersection)

Let $S_n = \{X_1 \ldots X_N\}$; where each $X_N$ is a "ratings set," the data from 1 rating sheet Let $X_N = \{x_1 \ldots x_m\}$; where each $x_m$ is an individual rating item $x_m$ is of type Boolean, or Integer $1 \leq x_m \leq 5$ $x_m$ is indexed s.t., e.g. $x_2$ is "has interactants", $x_3$ is "has interactants behind", etc.

Equivalently, a scenario can be expressed by the 3 phases q of each interaction:

$X_N = q_1 \cup q_2 \cup q_3$ where each $q_k$ equals $\{x_i \ldots x_j\}$ s.t. each x is uniquely in one q.

Therefore, ratings can be identified by what they express (addressable by index) and by what phase of the interaction they are from (related to a unique q).

As shorthand we may write: $X = \{X_1 \ldots X_N\} \forall X_N$ across all $S_n$; i.e. "the set of all ratings sets."

The scenario metadata can be calculated as follows:

For each $S_n \exists M_{S_n} | M_{S_n} = \{m_1 \ldots m_k\}$;

$M_{S_n}$ is a set of metadata; $m_k$ is a metadata parameter.

$M_{S_n}$ always includes one weight factor, denoted $m_w$ as useful shorthand.

Metadata also includes location, type of intersection, approximate time of day, etc.

As shorthand, $M = \{M_{S_1} \ldots M_{S_n}\}$; i.e. "the set of all metadata for all scenarios"

Examples:

Select ratings in appropriate metadata conditions across all scenarios:

$\{X_N | X_N \in S_n \& \{m_1, m_2\} \in M_{S_n} \forall S_n \in S\}$ i.e. "all ratings for controlled intersections ($m_1$), during the day ($m_2$)"

Select ratings in appropriate metadata conditions from one scenario:

$\{X_N | X_N \in S_n \& m_2 \in M_{S_n}\}$ i.e. "all ratings during the day ($m_2$) for a particular scenario $S_n$"

A filtering notation can also be used. For example, $F(Y, f)$ applies $f$ elementwise to each member of an arbitrary set Y Metadata selection can equivalently be written: $F(X, f_{meta})$ where $f_{meta}$ is defined:

$f_{meta}: \{X_N \to X_N$ if $\{m_j \ldots m_k\} \in M_{S_n}$ for $S_n \ni X_N$, otherwise $\emptyset\}$ for a set of one or more arbitrary metadata conditions $\{m_j \ldots m_k\}$ For convenience we define a set of relevant metadata condition functions and refer to each as: $f_{meta_m}$, where this filters for the $meta_m$ metadata condition.

Filtering can also be done on properties of $X_N$, e.g. "has overrides" or "has interactants"

$f: \{X_N \to X_N$ if $x_{2,N} = 1$ for $x_{2,N} \in X_N$, otherwise $\emptyset\}$ i.e. "all ratings sets $X_N$ in which 'has interactants' ($x_2$) was true ($x_{2,N} = 1$)"

For convenience we define three common filter functions, using the above approach:

$$f_j \begin{cases} f_1 \text{ no interactants,} & j_1 \text{ condition} \\ f_2 \text{ has interactants,} & j_2 \text{ condition} \\ f_3 \text{ has interactants behind,} & j_3 \text{ condition} \end{cases}$$

$F(X, f_{meta_m}, f_j)$ applies the two filters in turn, and is identical to $F(X, f_{meta_m}) \cap F(X, f_j)$ Similarly, $F(X_N, f)$ applies $f$ elementwise to each member of $X_N$ Example:

$F(X_N, f)$ where $f: \{x_m \to x_m$ if $x_m \in q_1$, otherwise $\emptyset\}$

"ratings for stage 1 ($q_1$), the 'approaching phase' of some ratings set $X_N$"

This function can be refereed to as $f_q$.

In step S1210 the controller 14 accumulates the ratings and metadata, and as discussed herein sorts the ratings X by interactant conditions J, and metadata conditions M relevant to the scenario S and calculates the weighted average of scores within each condition. The data can be stored as a parameters in branching tree structure. See for example, FIG. 7. That is, the results can be accumulated into a scoring pipeline with separate results accumulated into $1+(J*(1+M))$ or $1+\Phi$ groups. Each group can contain four subgroups, such as all data, "approaching" data, "at" data, and "leaving" data. The scoring pipeline can be calculated with the following fundamental expression:

$$\Phi = \{\varphi\} = \{(1, meta_1, \ldots, meta_m) \times (j_1, j_2, j_3)\}$$

Thus, scoring can be calculated by generating interaction condition combinations, where $meta_m, j$ are metadata and interaction conditions, and $\varphi$ is a 2-tuple of those conditions.

$$\Phi = \{\varphi\} = \{(1, meta_1, \ldots, meta_m) \times (j_1, j_2, j_3)\}$$

Take ratings $x_{n,N} \in X_N \forall X_N$ in $F(X, f_{meta_m}, f_j)$, the ratings from 1 ratings sets N selected by some $\varphi$, and average them. Do this to create scores for all interaction conditions:

$$Y = \left\{ \frac{\sum_{N=1}^{l}(x_{n,N} \cdot m_{w_N})}{l} \forall (meta_m, j) \in (1, 1) \cup \Phi \right\}$$

where $m_{w_l}$ is the weight factor $m_w$ such that $m_{w_l} \in M_{S_n}$ & $X_N \in S_n$ & $x_{n,N} \in X_N$, (i.e. "the weight factor for the corresponding scenario, from the metadata")

For convenience:

$Y = \{\cup R(x_{m,j}) \forall x_{m,j}\} = \{y_i\}$ (i.e. "the set of all scores, for all combinations of conditions")

In step S1220, the controller 14 calculates a vehicle behavior score. The vehicle behavior score can be calculated using the following expression $$Y = \left\{ \frac{\sum_{N=1}^{l}(x_{n,N} \cdot m_{w_N})}{l} \forall (meta_m, j) \in (1, 1) \cup \Phi \right\}$$

where $meta_m, j$ are metadata and interaction conditions, $\Phi$ is the scoring pipeline previously defined, $x_{n,N}$ are ratings from l ratings sets N, $m_{w_N}$ are metadata weight factors, and Y is the resulting set of scores.

The predefined ideal scores are stored in the data storage in step S1230 and can be: $\forall y_l \exists y_{0_n}$ which is the ideal feature score for the rating type $x_n$ out of which y was constructed. Moreover, filtering operations can be performed, if desired, as follows:

F(Y, $f_{meta_m}$, $f_j$)={$y_l$}, a subset of Y, for conditions $f$ as above

K($y_l$)=(meta$_{m,j}$), returns the conditions, if any, to use to select a feature score The calculated scores along with predefined ideal scores are then used by the controller 14 in step S1240 to determine the differences between the ideal score and actual, calculated score. In step S1250 the parameters P can be mapped to the calculated scores. Mapping of the parameters to the scores (which could be identified by their original index n) they affect, via a filter function $f_{y_l}$ is calculated using the following expression:

J(P, $f_{y_l}$)={$p_i$} s.t. the $p_i$ are those to be adjusted by some predetermined $y_l$ (i.e. "a filter over parameters").

In step S1260 the vehicle parameters P are stored as the Overall value, Threshold, Min, max, Delta and J*(1+M) Perturbations. The parameters P can be a set of vehicle parameters (e.g. max acceleration, max braking, etc.)

For a particular parameter $p_i \in P$, $p_i$={$p_{0_i}$, $p_{thresh_i}$, $p_{\Delta_i}$, $p_{min_i}$, $p_{max_i}$}Å{$\Delta p_{i_\varphi} \forall \varphi$} where $\varphi$ represents a 2-tuple combination of m+1 metadata and j interaction conditions:

(1,meta$_1$, . . . ,meta$_m$)×($j_1$,$j_2$,$j_3$)

A parameter is thus a set of 5+J×(1+M) values, where J is the number of interactant conditions (3 in our examples) and M is the number of metadata conditions (also 3 in the examples). So in the examples, a parameter has 5+12 or 18 sub-values.

To calculate a parameter value for a given situation in the world, the parameter and its perturbations are added together from more general to more specific. Therefore, some sub-values inherently depend on (perturb) other values.

A value with no m or j condition depends on no other values: $p_{0_i}$. In this situation $\varphi$=(1,1).

A sub-value with a j condition but no m (and hence a corresponding $f_j$ filter only) depends on the value of $p_{0_i}$: it is e.g. $\Delta p_{i1,j_1}$ for condition $j_1$. Here $\varphi$=(1,$j_1$).

A sub-value with both j and m conditions, e.g. $\Delta p_{meta_m, j_1}$ depends on $\Delta p_{i1,j_1}$.

A value may have multiple inheritors that depend on it, but can depend directly on only one other value.

Therefore operators can be defined to recover dependencies:

I($\rho$, $p_i$)={$\Delta p_{i_\varphi}$| each $\Delta p_{i_\varphi}$ depends on $\rho$}, i.e. "a subset of {$\Delta p_{i_\varphi} \forall \varphi$} that depend on $\rho$"

S($\rho$,$\tilde{p}_i$)=r|r$\in$\{$p_{0_i}$, $\Delta p_{i_\varphi} \forall \varphi$} and $\rho$ depends on r, i.e. "the value $\rho$ perturbs"

$S(p_{0_i},p_i)=0$

Using this definition of S that recovers the unique dependency of a sub-value, a set of all dependencies can be recovered recursively for a given $\rho$:

$S_{recursive}(\rho,p_i)=\{\rho\} \cup S_{recursive}(S(\rho,p_i),p_i)$

For convenience mechanisms to correlate between $\varphi$ conditions and parameter values can be defined:

$\kappa(p_{0_i})=(1,1); \kappa(\Delta p_{i_\varphi})=\varphi=(meta_m,j)$, i.e. "the conditions necessary to select this value"

$k(p_i, meta_m, j)=\rho|\rho=p_{0_i}$ if meta$_m$=j=1, else $\rho=\Delta p_{i_\varphi}$ i.e. "the parameter value within {$p_{0_i}$, $\Delta p_{i_\varphi} \forall \varphi$} uniquely related to conditions $\varphi$"

Thus a parameter to be used by the vehicle in a given situation characterized by metadata conditions m and interactant conditions j can be recovered by:

$$\phi = \sum S_{recursive}(k(p_i, meta_m, j), p_i)$$

These parameters, along with the mapping of the parameter to the scores and the difference in the ideal value and the calculated vehicle score are used to determine a potential parameter update in step S1270.

Parameter updates can be calculated as follows:

$$\forall y_l \in Y, p_i \in J(P, f_{y_l}):$$

$$\begin{cases} \text{if } |y_l - y_{0_n}| > p_{thresh_i}, \text{ then let } c = (y_l - y_{0_n}) \cdot p_{\Delta_i}, \text{ let } \rho \text{ be } k(p_i, K(y_l)) \\ \text{(i.e. "the element of } \{p_{0_i}, \Delta p_{i\varphi}\} \text{ uniquely selected by filters } K(y_l)\text{")}; \text{ then} \\ \quad \begin{cases} \text{if } p_{min_i} \leq (c + \sum S_{recursive}(\rho, p_i)) \leq p_{max_i} \text{ then} \\ \text{set } \rho' = \rho + c \text{ ("apply an correction")} \\ \text{and } \rho'_e = p_e - c \forall \rho_e \in I(\rho, p_i) \text{ ("apply an anti–correction to inheritors")} \\ \text{else: warn user about value of } \rho \end{cases} \\ \text{else, do nothing} \end{cases}$$

The result of this process is a new set of parameter values P', which includes the set of updated parameters $p_i'$ generated by applying the corrections to individual $p_0$ and $\Delta p$ values.

Once the modified parameter set of P' values is identified, simulated verification and update can proceed as shown in FIG. 12. In one embodiment, in step S1280, the potential parameter updates can be run in the verification system 28 of the controller 14 to determine simulated verification. If the controller 14 determines that the updates are safely demonstrated (no issue detected) in step S1290, the potential parameter updates are applied in step S1300 and stored in the data storage in step S1260.

To update parameter values P:

$$\forall y_l \in Y, p_i \in J(P, f_{y_l}):$$

-continued $$\begin{cases} \text{if } |y_\iota - y_{0_n}| > p_{thresh_i}, \text{ then let } c = (y_\iota - y_{0_n}) \cdot p_{\Delta_i}, \text{ let } \rho \text{ be } k(p_i, K(y_\iota)) \\ \quad \text{then} \\ \quad \begin{cases} \text{if } p_{min_i} \le (c + \sum S_{recursive}(\rho, p_i)) \le p_{max_i} \text{ then set } \rho' = \rho + c \\ \text{and } \rho'_e = p_e - c \forall \, \rho_e \in l(\rho, p_i) \\ \text{else: warn user about value of } \rho \end{cases} \\ \text{else, do nothing} \end{cases}$$

where $y_l$ is a score corresponding to ratings $x_n$; $y_{0_n}$ is the ideal value for that score; P is the set of parameters $p_i$ (each consisting of $\{p_0, p_{thresh_i}, p_{\Delta_i}, p_{min_i}, p_{max_i}\} \cup \{\Delta p_{p_{iq}} \forall \varphi\}$); J is a function that selects parameters $p_i$ relevant to a given score $y_i$; K is a function that selects metadata and interaction conditions meta$_m$,j for a score $y_j$; $\rho$ is a subcomponent of a parameter $p_i$; k is a function that selects a subcomponent $\rho$ of a parameter $p_i$ based on metadata and interaction conditions meta$_m$, j; $S_{recursive}$ is a function that returns recursively the set of all subcomponents of a parameter $p_i$ that $\rho$ depends on, including $\rho$ itself; and l is a function that returns the set of subcomponents $\rho_e$ that depend directly on $\rho$.

Once the parameter have been updated, the process can loop back to a new evaluation with the new parameters.

If the controller 14 determines that the updates are not safely demonstrated (i.e., an issue is detected) in step S1290, the controller 14 can notify the user in step S1310 that the updates have been refused via the display 20. That is, the controller 14 can notify the user that the update was not performed and the reason for that refusal.

The result of this transformation of subcomponents $\rho$ to $\rho'$ is a new set of parameter values P' for simulated verification or for the next iteration of the system that can be stored in the data storage.

Thus potential parameter updates can be performed as follows:

Associating differences between the ideal score and the calculated score with parameters P that they influence;

Comparing the differences between ideal score and the calculated score with each parameter's Threshold value;

If the differences between ideal score and the calculated score>Threshold: calculate potential update amount: (the differences between ideal score and the calculated score*Delta);

Associate the differences between ideal score and the calculated score to the relevant perturbation or overall value, based on values of J & M Check if the differences between ideal score and the calculated score*Delta would exceed thresholds if update applied Store correction in potential update array, if appropriate; otherwise warn the user The system 12 described herein results in an improved system for an automated vehicle 10 is desired. The system 12 for the automated vehicle 10 is capable of navigating a location with specific predetermined information in a socially acceptable manner, and updating and adapting the navigation process to better conform with acceptable social behavior.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Accordingly, these terms, as utilized to describe the present invention should be interpreted relative to a vehicle equipped with a system for an automated vehicle.

The term "configured" as used herein to describe a component, section or part of a device includes hardware and/or software that is constructed and/or programmed to carry out the desired function.

of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for an automated vehicle, comprising:
a user input interface; and
an electronic controller programmed with instructions to operate at least one aspect of the automated vehicle, configured to process information input through the user input interface, the information input through the user input including data directed to predetermined parameters related to the at least one aspect of the automated vehicle at a predetermined location and including information related to the predetermined location, determine whether the information exceeds a risk threshold in a plurality of simulated environments, and when the electronic controller determines the information does not exceed the risk threshold, update the instructions based on the information to alter the least one aspect of the automated vehicle, such that when the automated vehicle encounters the predetermined location, automated behavior of the automated vehicle is updated for the predetermined location.

2. The system according to claim 1, wherein the predetermined parameters include steering angle of the automated vehicle or speed of the automated vehicle.

3. The system according to claim 1, wherein the predetermined parameters include approach of the predetermined location or departure of the predetermined location.

4. The system according to claim 1, wherein the information includes a plurality of ratings related to the least one aspect of the automated vehicle.

5. The system according to claim 4, wherein the electronic controller is configured to determine whether the least one aspect of the automated vehicle was operated above a predetermined rating based on the plurality of ratings.

6. The system according to claim 1, wherein the information includes metadata related to the predetermined location.

7. The system according to claim 6, wherein the metadata includes at least one of geocoordinates or time.

8. The system according to claim 1, wherein each of the predetermined parameters includes a range of operation.

9. The system according to claim 8, wherein the electronic controller is configured to alter the range of operation each of the predetermined parameters based on the information.

10. A method of operating a system for an automated vehicle, comprising:
inputting information into a user input interface, the information input through the user input including data directed to predetermined parameters related to the at least one aspect of the automated vehicle at a predetermined location and including information related to the predetermined location;
processing with an electronic controller the information input through the user input interface, the electronic controller being programmed with instructions to operate at least one aspect of the automated vehicle; and
updating, with the electronic controller, the instructions based on the information to alter the least one aspect of the automated vehicle, when the electronic controller determines the information does not exceed a risk threshold in a plurality of simulated environments, such that when the automated vehicle encounters the predetermined location, automated behavior of the automated vehicle is updated for the predetermined location.

11. The method according to claim 10, wherein the predetermined parameters include steering angle of the automated vehicle or speed of the automated vehicle.

12. The method according to claim 10, wherein the predetermined parameters include approach of the predetermined location or departure of the predetermined location.

13. The method according to claim 10, wherein the information includes a plurality of ratings related to the least one aspect of the automated vehicle.

14. The method according to claim 13, further comprising determining with the electronic controller whether the least one aspect of the automated vehicle was operated above a predetermined rating based on the plurality of ratings.

15. The method according to claim 10, wherein the information includes metadata related to the predetermined location.

16. The method according to claim 15, wherein the metadata includes at least one of geocoordinates or time.

17. The method according to claim 16, wherein each of the predetermined parameters includes a range of operation.

18. The method according to claim 17, further comprising altering with the electronic controller the range of operation for each of the predetermined parameters based on the information.

* * * * *